United States Patent
Brenner et al.

(10) Patent No.: US 11,550,878 B2
(45) Date of Patent: Jan. 10, 2023

(54) MEDIA CONTENT PROCESSING TECHNIQUES FOR RIGHTS AND CLEARANCE MANAGEMENT

(71) Applicant: Dubset Media Holdings, Inc., San Francisco, CA (US)

(72) Inventors: Vadim Brenner, San Francisco, CA (US); Stephen White, San Francisco, CA (US); Ryan Wigley, Brooklyn, NY (US); Mijat Nenezic, Miami Beach, FL (US)

(*) Notice: Subject to any disclaimer, the term of this patent is extended or adjusted under 35 U.S.C. 154(b) by 633 days.

(21) Appl. No.: 16/382,660

(22) Filed: Apr. 12, 2019

(65) Prior Publication Data

US 2019/0318060 A1   Oct. 17, 2019

Related U.S. Application Data

(60) Provisional application No. 62/657,493, filed on Apr. 13, 2018.

(51) Int. Cl.
G06F 21/10 (2013.01)
H04N 21/8352 (2011.01)
H04N 21/233 (2011.01)
H04N 21/4627 (2011.01)

(52) U.S. Cl.
CPC .......... G06F 21/10 (2013.01); H04N 21/233 (2013.01); H04N 21/4627 (2013.01); H04N 21/8352 (2013.01)

(58) Field of Classification Search
CPC ............. H04N 21/8352; H04N 21/233; H04N 21/4627; H04N 21/2541
See application file for complete search history.

(56) References Cited

U.S. PATENT DOCUMENTS

| 9,654,447 | B2* | 5/2017 | Brock | H04N 21/4627 |
| 2002/0082731 | A1* | 6/2002 | Pitman | H04N 21/4394 700/94 |
| 2004/0009763 | A1* | 1/2004 | Stone | H04H 20/14 455/410 |
| 2006/0048633 | A1* | 3/2006 | Hoguchi | G10H 1/06 84/600 |
| 2009/0217343 | A1* | 8/2009 | Bellwood | H04L 63/10 726/1 |
| 2010/0255772 | A1* | 10/2010 | Hellman | H04H 20/40 455/3.06 |
| 2012/0239558 | A1* | 9/2012 | Zhang | G06Q 40/00 705/39 |
| 2015/0213240 | A1* | 7/2015 | Bucciarelli-Tieger | H04H 20/93 381/56 |
| 2019/0205399 | A1* | 7/2019 | Mathur | G11B 27/28 |

* cited by examiner

Primary Examiner — Pinkal R Chokshi

(74) Attorney, Agent, or Firm — Hogan Lovells US LLP

(57) ABSTRACT

Systems and methods in accordance with various embodiments of the present disclosure provide improved techniques to process and manage media content and associated intellectual property rights associated with the media content. Intellectual property rights associated with media content can include copyright, trademarks, licenses to composition, synchronization, performance, recordings, etc. In particular, various embodiments provide media licensing management and monetization based on media licensing using a centralized registry of media content and associated asset rights.

20 Claims, 13 Drawing Sheets

| | Artist | Title | Start | End | | | |
|---|---|---|---|---|---|---|---|
| 1. | Hardwell | Encoded | 00:06 | 00:26 | + | ✎ | ✗ |
| 2. | Mike Mango | Deeper Love | 00:34 | 03:52 | + | ✎ | ✗ |
| 3. | Pony (Jump On It) | Pony (Jump on it) [Sick Individuals Remix] | 03:52 | 08:10 | + | ✎ | ✗ |
| 4. | Thomas Gold Feat. Bright Lights | Believe (Original Mix) | 07:48 | 12:13 | + | ✎ | ✗ |
| 5. | Audi Feat. Lady Antebellum | Something Better (Extended Version) | 12:34 | 16:08 | + | ✎ | ✗ |
| 6. | Lush & Simon x Rico & Miella | We Are Lost (Mamik Remix) | 16:07 | 18:25 | + | ✎ | ✗ |
| 7. | Dyro & Conro Feat. Envy Monroe | Bittersweet | 19:53 | 23:16 | + | ✎ | ✗ |
| 8. | Jakesgarlato | Edamame | 23:29 | 26:28 | + | ✎ | ✗ |
| 9. | Twoloud – Mojjo & Mind'cd | Objectif | 26:28 | 29:11 | + | ✎ | ✗ |
| 10. | Hi-Lo | Renegade Master | 29:14 | 32:09 | + | ✎ | ✗ |
| 11. | Jaggs | Bleepdifreak (Vip Edit) | 32:09 | 35:28 | + | ✎ | ✗ |
| 12. | Boregous & Mike Hawkins | Lovestruck | 35:28 | 38:45 | + | ✎ | ✗ |
| 13. | Wiwek, Gregor Salto Feat. Mc Spyder | Trouble | 38:45 | 42:16 | + | ✎ | ✗ |
| 14. | Kura | Namek | 42:16 | 45:16 | + | ✎ | ✗ |
| 15. | NWL | Unstoppable | 45:16 | 49:40 | + | ✎ | ✗ |
| 16. | Thomas Newson – Joey Dale | Timecode (Original Mix) | 49:40 | 53:02 | + | ✎ | ✗ |
| 17. | FTampa, The Fish House | Q31 | 53:01 | 55:54 | + | ✎ | ✗ |
| 18. | Hardwell-Wiwek | Chameleon (Instrumental Mix) | 55:48 | 58:37 | + | ✎ | ✗ |

FIG. 6

MEDIA CONTENT PROCESSING TECHNIQUES FOR RIGHTS AND CLEARANCE MANAGEMENT

CROSS-REFERENCE TO RELATED APPLICATIONS

This U.S. Non-provisional Patent Application claims priority to and benefit of U.S. Provisional Patent Application No. 62/657,493 filed Apr. 13, 2018, which is hereby incorporated by reference herein in its entirety.

BACKGROUND

Advancements in technology are constantly influencing and evolving the music and media content industry, not only in how music is distributed and stored, but also how it is created. While traditional instruments can produce analog music that can then be recorded, converted to a digital format to be stored and distributed electronically, music can now also be created digitally from its conception. Many users compile and mix various music samples digitally for distribution as their own music, which can raise a problem in determining the appropriate licensing rights associated with the music samples used in mixes. With the convenience and ease of portable digital music players, smartphones, cloud computing, and seemingly infinite digital libraries of music, there is an increased need in the industry to distribute media digitally and electronically while preserving all the associated licensing rights.

BRIEF DESCRIPTION OF THE DRAWINGS

Various embodiments in accordance with the present disclosure will be described with reference to the drawings, in which:

FIG. 6 illustrates an example of identified segments of media content in accordance with various embodiments;

DETAILED DESCRIPTION

Systems and methods in accordance with various embodiments of the present disclosure may overcome one or more of the aforementioned and other deficiencies experienced in conventional approaches to distribute media content digitally and manage associated intellectual property rights in a secure, immutable, efficient, and automatic manner. Intellectual property rights associated with media content can include copyright, trademarks, licenses to composition and/or recording, synchronization, performance, recordings, etc. In particular, various embodiments provide improved techniques of managing media content using a centralized, automated registry to process media content, identify segments of media content, and determine associated rights with the segments of media content.

Music creation has undergone exponential growth giving rise to a new wave of creators, musicians, remixers, and curators. In the last 80 years, the music industry has recorded and registered 5 million hours of new music. In comparison, every two months, the DJ community creates 5 million hours of newly recorded music. The DJ community consists of musicians and individual users or consumers, and their music generally involves sampling, mixing, modifying, and compiling snippets of other music created by other artists. The music created by the DJ community can be referred to as user-generated content (UGC), or UGC media content. With the advent of the internet and digital media processing, UGC has exploded because users can now easily create their own music and videos. Currently, users upload about 20,000 tracks of music per day on Spotify™, compared to 260,000 tracks of music uploaded by users on SoundCloud™ and 2,600,000 tracks of music uploaded by users on YouTube™. Outside of YouTube™, music services are not equipped to properly handle UGC.

The technical problems in handling UGC include first the identification of sampled music in UGC, for example, in determining what master recording and master compositions are being sampled within the UG music. Second, once the music sampled has been identified, then the multiple rights holders and their corresponding associated rights may be notified in advance of distribution. Lastly, the internet has posed a territorial problem in the distribution of the music, as there are many complexities and different laws associated with access to media content and cross rights-by-territory. Embodiments of the present invention centralize UGC to give DJs, users, rights holders, and distributors an accessible platform to manage their music and rights in an improved, user-friendly, intuitive, efficient, and secure manner. Embodiments of the present invention provide the digital media processing technology, rights management database, and user-friendly interfaces to allow users to create new mix and remix distribution and monetization opportunities built on transparency, ownership control, and simplicity.

Figure 1:
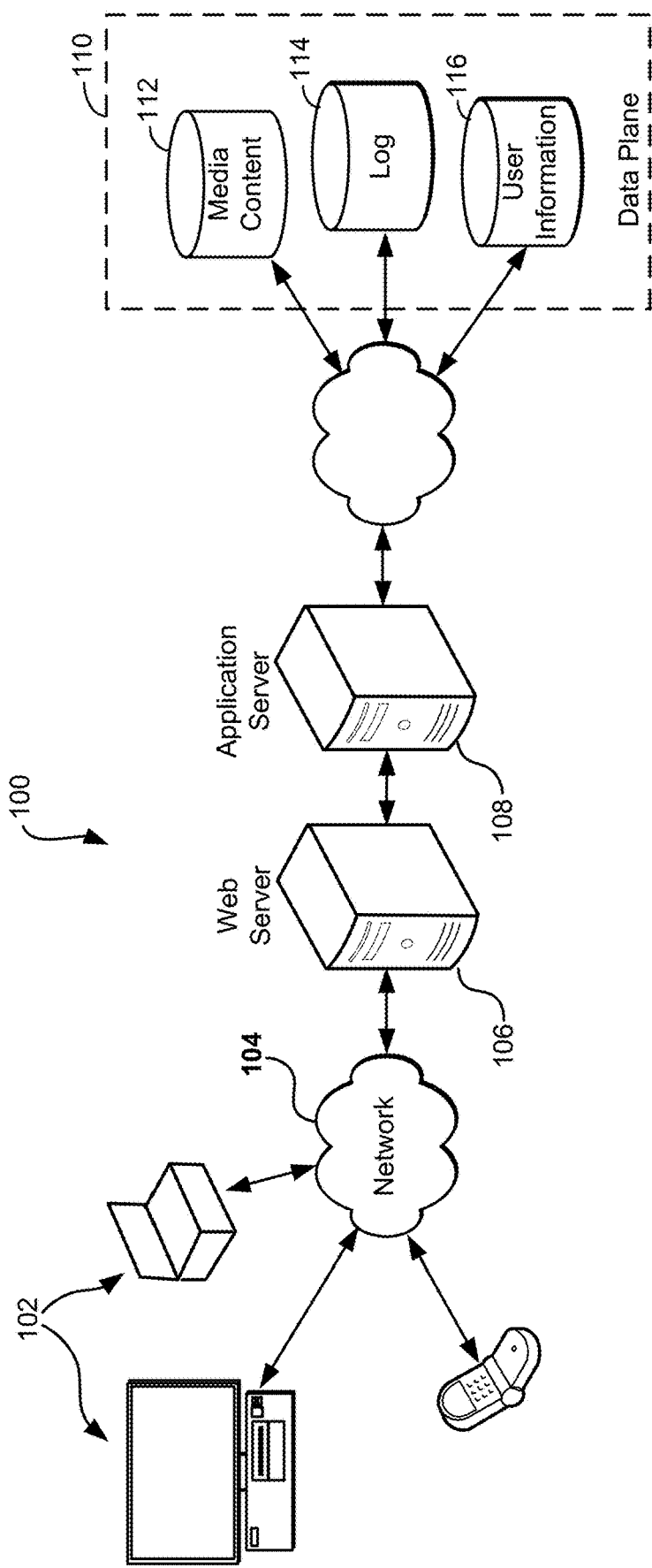
FIG. 1 illustrates an environment in which various embodiments can be implemented.

FIG. 1 illustrates an example of an environment 100 for implementing aspects in accordance with various embodiments. Although a Web-based environment is used for purposes of explanation, different environments may be used, as appropriate, to implement various embodiments. An electronic client device 102 can include any appropriate device operable to send and receive requests, messages, or information over an appropriate network 104 and convey information back to a user of the device; examples of client devices include personal computers, cell phones, portable music players, tablets, laptops, electronic book readers, etc. The network can include any appropriate network, including an intranet, the Internet, a cellular network, a local area network, or any other such network or combination thereof. Protocols and components for communicating via such a network can be enabled by wired or wireless connections, and combinations thereof. In this example, the network includes the Internet, as the environment includes a Web server 106 for receiving requests and serving content in response to the requests, although for other networks and other devices could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110. Resources of this plane are not limited to storing and providing access to data, but there can be several application servers, layers, or other elements, processes, or components, which may be linked or otherwise configured, to interact and perform tasks such as obtaining data from an appropriate data store. The term "data store" refers to any device or combination of devices capable of storing, accessing, and retrieving data, which may include any combination and number of data servers, databases, data storage devices, and data storage media, in any standard, distributed, or clustered environment. The application server provides admission control services in cooperation with the data store, and may be able to generate content such as text, graphics, audio, and/or video to be transferred to the user, which may be served to the user by the Web server in the form of HTML, XML, or another appropriate structured language in this example. In some embodiments, the Web server 106, application server 108 and similar components may be part of the data plane. The handling of all requests and responses, as well as the delivery of content between the client device 102 and the application server 108, can be handled by the Web server.

The data stores of the data plane 110 can include several separate data tables, databases, blocks, blockchains, or other data storage mechanisms for storing data relating to processing media content and managing licensing rights associated with the media content. For example, the data plane illustrated includes mechanisms for storing media content data 112 and user information 116, which can be used to receive, process, store, and serve media content. The data plane also is shown to include a mechanism for storing log data 114, which can be used for purposes such as reporting, analysis, and determining the chain of custody for media content. It should be understood that there can be many other aspects that may need to be stored in a data store, such as for access right information, which can be stored in any of the above-listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might upload UGC. In this case, components of the data plane might access the user information to verify the identity of the user, process the UGC, and access the media content catalog detail information to obtain information about the UGC and determine associated licensing rights with the media content identified in the UGC. The information then can be returned to the user, such as in a results listing on a Web page that the user is able to view via a browser on the user device 102, showing the identified media content in the UGC, the rights holders of the media content, and licensing information associated with the media content. Information for the media content of interest can be viewed in a dedicated page or window of the browser.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

In some embodiments, the media content processing system may include a centralized registry that contains the digital assets, such as the licensing rights, along with associated metadata. Advanced content identification technologies may be implemented to unravel the complexities of derivative works of media content whose rights holders have been identified. Local licensing nodes may enable individual rights holders to access data and establish rules. The media content processing system may provide a global exchange that networks and connects all nodes together enabling cross-rights holder content licensing and clearance. Rights holders and content creators can manage their mix and remix catalogs efficiently across music services. In some embodiments, the media content processing system may also include a marketplace providing media service providers and rights holders a seamless one-click approach to program approvals and the required catalog licensing. Rights holders may be able to choose where their content is distributed and how they generate revenue through digital assets, such as composition rights, recording rights, performance rights, synchronization rights, etc. The media content processing system allows rights holders to be in control of where media content is distributed, while allowing media service providers to offer pricing models and revenue splits that suit their business.

According to embodiments of the present application, the media content processing system may create an offer, for example, a media content service provider may offer per stream or revenue share pricing models directly to rights holders. Subsequently, the rights holders may review offers. Rights holders may be able to review the program details, including revenue splits, territory splits, and guaranteed minimums. After reviewing the offers, the rights holders may choose to accept offers. Rights holders accept the pricing models that work best for them and content is distributed.

These transactions may be performed with the security, consistency, and transparency of a centralized database and media content management system. Advantages of using various embodiments described herein to conduct media content and digital asset processing include a central registry of media content registration information (e.g., mixes/remixes) that is secure and automated. The centralized registry may also automatically determine rights ownership and association with the media content, which can be determined using a repository of business rules for use and distribution. Additionally, a marketplace for financial terms and program details/approvals can include clearance, distribution, consumption and royalty information, real-time digital wallet information, reporting and payments on scheduled intervals or in real time.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions.

According to various embodiments, the media content processing system may include a media content database and a media content processing module. In another embodiment, the media content database and media content processing module may be separate independent entities; for example, the media content database may be independently operated from, but in communication with, the media content processing system. The media content database according to embodiments of the present application may include several key subsystems.

Figure 2:
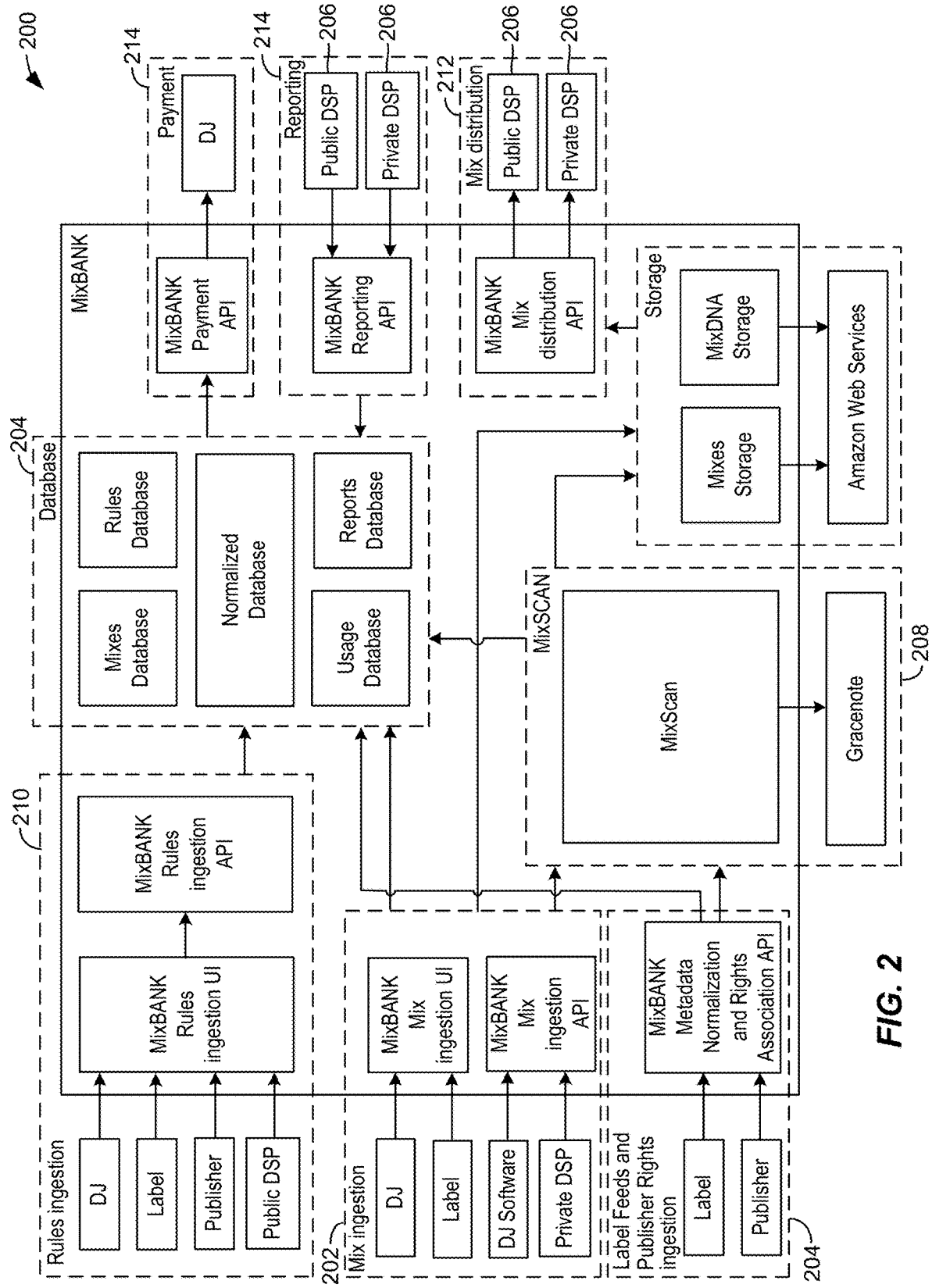
FIG. 2 illustrates an example block diagram of a media content processing systems with a media content database in accordance with various embodiments.

FIG. 2 illustrates an example block diagram of a media content processing system with a media content database in accordance with various embodiments. The media content processing system with media content database 200 may include several components. The media content processing system may include mix/remix registry components 202. DJs, DJ managers and other content suppliers may be set up with an account with the media content database and/or media content processing system 200. Mixes and remixes may be uploaded/ingested using a dashboard. Distribution preferences (music services, timing, exclusivity, etc.) may be configured during the submission process. In addition, all mixes and remixes may each be registered with a unique media content Mix ID.

The media content processing system may include rights holder database of copyright information (recordings and compositions) components 204. The rights holder database may be a part of the media content database. Labels, distributors and publishers may be set up with an account in the media content database. Catalogs consisting of factual metadata and copyright information may be ingested into the media content database. Master recordings may be fingerprinted (if necessary) to ensure they can be identified in mixes and remixes by the media content processing system or module. Rights holders usage and distribution rules may be set up automatically during ingestion using various messaging protocols, for example, Digital Data Exchange (DDEX) Electronic Release Notification (ERN) protocol (which can be used to deliver and communicate ownership and usage details for a commercial music catalog, such as authorized territories, use in ad-supported vs subscription music services, interactive and non-interactive user interactions, etc.), and DDEX Single Resource Release (SRR) protocol (which can be used to deliver and communicate whether a song in a commercial catalog delivered using DDEX ERN can be available for use within UGC derivative works, such as DJ mixes and remixes). Rights holder may be able to set up additional usage and distribution rules in the media content database through a dashboard.

The media content processing system may include Digital Service Provider (DSP) programs 206. Music services may create program details they want to include mixes and remixes. Rights holders may be notified of new programs with financial details. Rights holders may accept or decline to allow their catalogs to be used in mixes and remixes distributed to these programs. The media content processing system may include the media content recognition technology components 208. Mixes and remixes may be run through the media content processing system and the recognition technology components to identify the songs (tracks/titles) in them. Media content metadata (track/title list details) can be created for each mix and remix. For mixes, song start/end locations within the mix may be included. Mixes can be reviewed editorially/manually, as needed. The media content processing system may include mix/remix business rule clearance components 210. Identified songs (tracks/titles) within a mix/remix may be associated with rights holder copyright information. Songs may be verified against rights holder specified usage and distribution rules (if any exist for those songs). Mixes and remixes may then be cleared, blocked or put in a pending state. DJs may be informed of mix clearance status. The media content processing system may include distribution components 212. Cleared mixes and remixes may be issued ISRCs to make them available for commercial use. Cleared mixes and remixes may be distributed to music services using DDEX or proprietary protocols. In addition, because the same or other DJs may use the same song, title, or track in different mixes, with different durations or stylistic changes to the original song, title, or track, it may become a new work. As a result, the same song, title, or track can be issued a different ISRC from the original master. This is because each such song, title, or track may be a in a different style, may have a different duration, and may use differing portions of the song, title or track. Media content metadata information containing information about the original master recordings can be included. Additionally, the media content processing system may include royalty reporting and settlement components 214. Music services may provide consumption and financial reports for streamed mixes and remixes per territory. A system to track all newly issued ISRCs for song segments within mixes may be needed to ensure proper attribution of streaming data and royalties. Because each mix may contain more than 25 songs, for example, the system may need to keep track of all mappings between the newly created ISRCs for song segments and their original master sound recordings and compositions on which the song segments are based. This may be done in order to ensure correct attribution to the rightful owners. The media content database may generate per territory reports for rights holders. The media content database may automatically make payments to rights holders and DJs. Although the components are illustrated herein are shown as being part of a particular system or component, it should be understood that the components can be a part of one or more other systems or components without departing from the scope and spirit of the invention.

The media content processing system 200 may implement an improved technique to process media content that involves several processes. For example, the media content processing system may perform a general content clearance. In a general content clearance operation, mixes and remixes may be submitted into the media content database by DJs, DJ managers or other content suppliers with intent to have it cleared for distribution to multiple music services. The media content may be treated differently from content provided by media services providers (e.g., music service providers) who obtained mixes and remixes directly from DJs and DJ managers, because the music services providers would like to have it cleared only for distribution by them, and not any other media services providers or other entities.

However, embodiments of the invention provide methods that allow the media content to be retained as private content. In addition, the media content can also be submitted by other software, hardware or platforms that DJs and/or producers use to create mixes and/or remixes, by integrating the media content processing system capabilities, as disclosed herein, through an external API. For example, a DJ creating a mix or remix using Pioneer DJ hardware with Serato software, or using Native Instruments hardware and software, may press a button (or provide other such input) that enables software and/or hardware to interface directly with the media content processing system, as disclosed herein, to submit the mix or remix for distribution.

Figure 3:
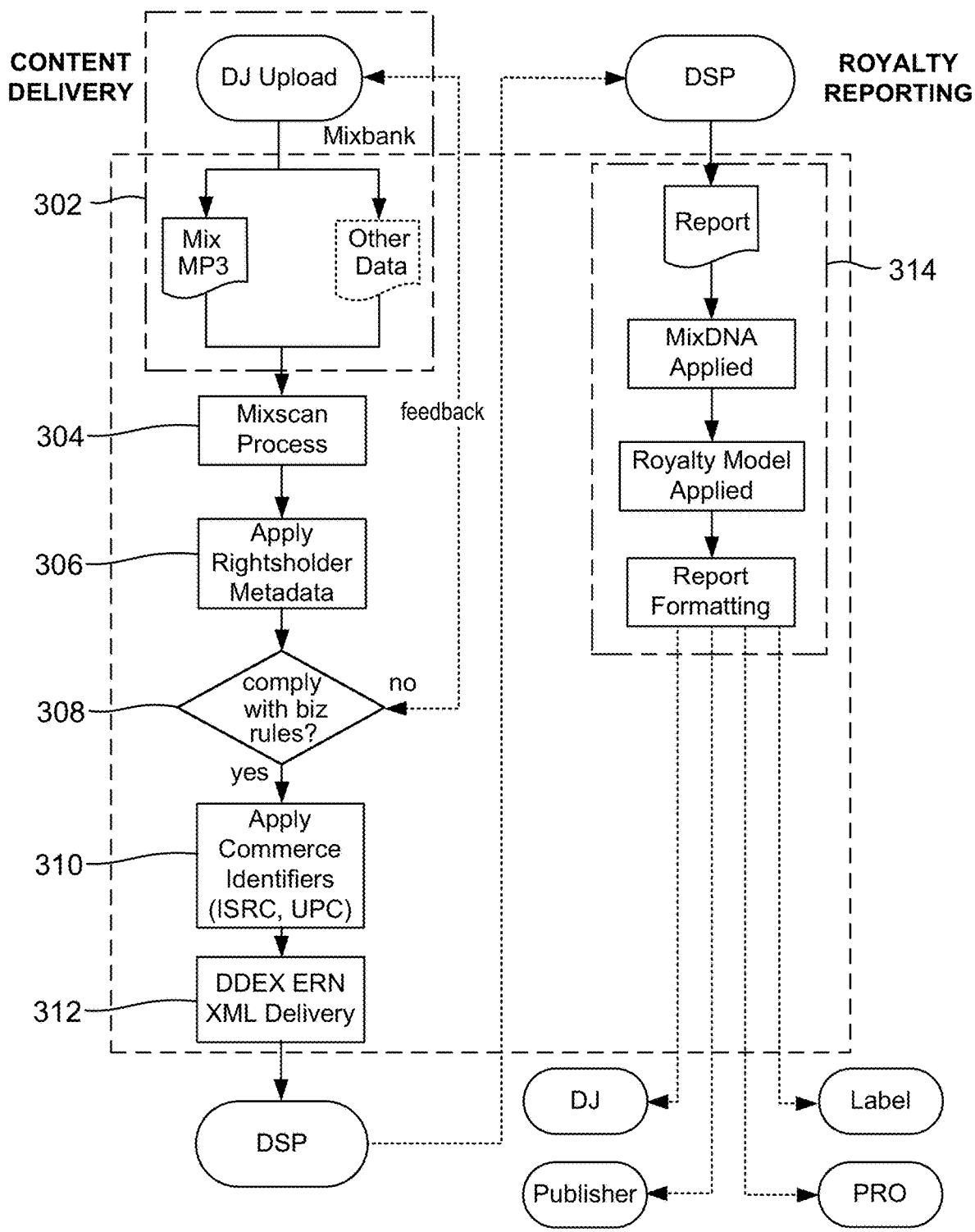
FIG. 3 illustrates an example flow diagram of a technique for processing media content in accordance with various embodiments.

FIG. 3 illustrates an example flow diagram of a technique for processing media content in accordance with various embodiments. For example, at 302, a mix or remix can be submitted to the media processing system by the DJ or the DJ manager for general clearance and distribution to all selected music services by the DJ or DJ manager. DJs, DJ managers or other content suppliers may upload content into the media content database through authenticated user accounts. Uploads may include audio files (such as FLAC, WAV, .mp3) and optional data (such as track lists generated by DJ software). According to some embodiments, third parties may bulk upload into the media content database using API described in the next section (in development).

At 304, an upload may be tagged and uniquely registered within the media content database with a unique identifier, for example, Mix ID. Uploaded mixes or remixes may be processed by the media content processing system or module and segments of the underlying tracks or songs may be identified. Identified songs or tracks for the segments may be associated with the rights holder copyright information, if available in the media content database.

At 306, business rules for each rights-holder type (if available) may be associated with a mix or remix and applied to validate if the mix or remix can be distributed. At 308, if there are no rules that prevent content from distribution, a mix or a remix may be cleared. This may be done by analyzing each song segment for authorized distribution into each territory. The challenge solved and uniqueness of the system disclosed herein may be that it is able to handle situations in which each song segment has different rights holders in different territories, each possibly having their own set of restrictions. Each song segment may also have one or more publishers representing all of the composers and writers who own the rights to the melody and lyrics of any song, title, or track. Some songs, titles, or tracks may have 5 or 10 or more composers and writers. Each of the composers and writers or a group of them may be represented by different publishers in different parts of the world. The system, as disclosed herein, analyzes each territory's ownership, all the restrictions, and identifies if and where the mix or remix can be distributed based on the most common denominator. If even a single right holder business rule prevents it from being distributed a mix or a remix may be blocked. According to various embodiments, the media content database may have a content clearance policy with a predetermined threshold. For example, for a 100% clearance policy, even if one rights holder does not approve their content to be distributed in a mix/remix or if a song is identified and a rights holder is not known, the mix/remix will not be cleared for distribution. In other embodiments, other thresholds may be set, for example a more than 50% clearance policy. Subsequently, status and compliance instructions may be sent to the uploading party.

At 310, a standard commercial identifier (ISRC) may be assigned to each mix or remix and is associated with the unique Mix ID also assigned to each mix/remix. At 312, mixes and/or remixes may be delivered to music services using DDEX ERN or proprietary protocols, along with the ISRC, mix/remix metadata, mix/remix artwork, metadata for the song the remix is based on, and (when requested) media content metadata details (e.g., the underlying track information) within the mix. At 314, music services (DSPs) may report consumption data per territory for all mixes and remixes distributed to them, for each subscription type. The media content processing system may generate reports for rights holder per territory, per subscription type. In some embodiments, at 314, the media processing system may also manage the payment of royalties to underlying rights holders and DJs In another embodiment, the media content processing system may implement a private content clearance. Some music services may want to use the media content database to register and clear content that is intended to be used only by that music service and not made available for distribution to others. For that reason, this content may be designated and identified as private, and this type of customers as Private DSPs. However, volumes for this use case will be much higher than what may be submitted by a single DJ or a DJ manager, and that an API will be required instead of submitting through a dashboard. As such, an API to allow music services to submit mixes and remixes in bulk may be implemented in accordance with various embodiments of the invention, where the API is designed to provide the same type of capabilities as described above for the general content.

Figure 4:
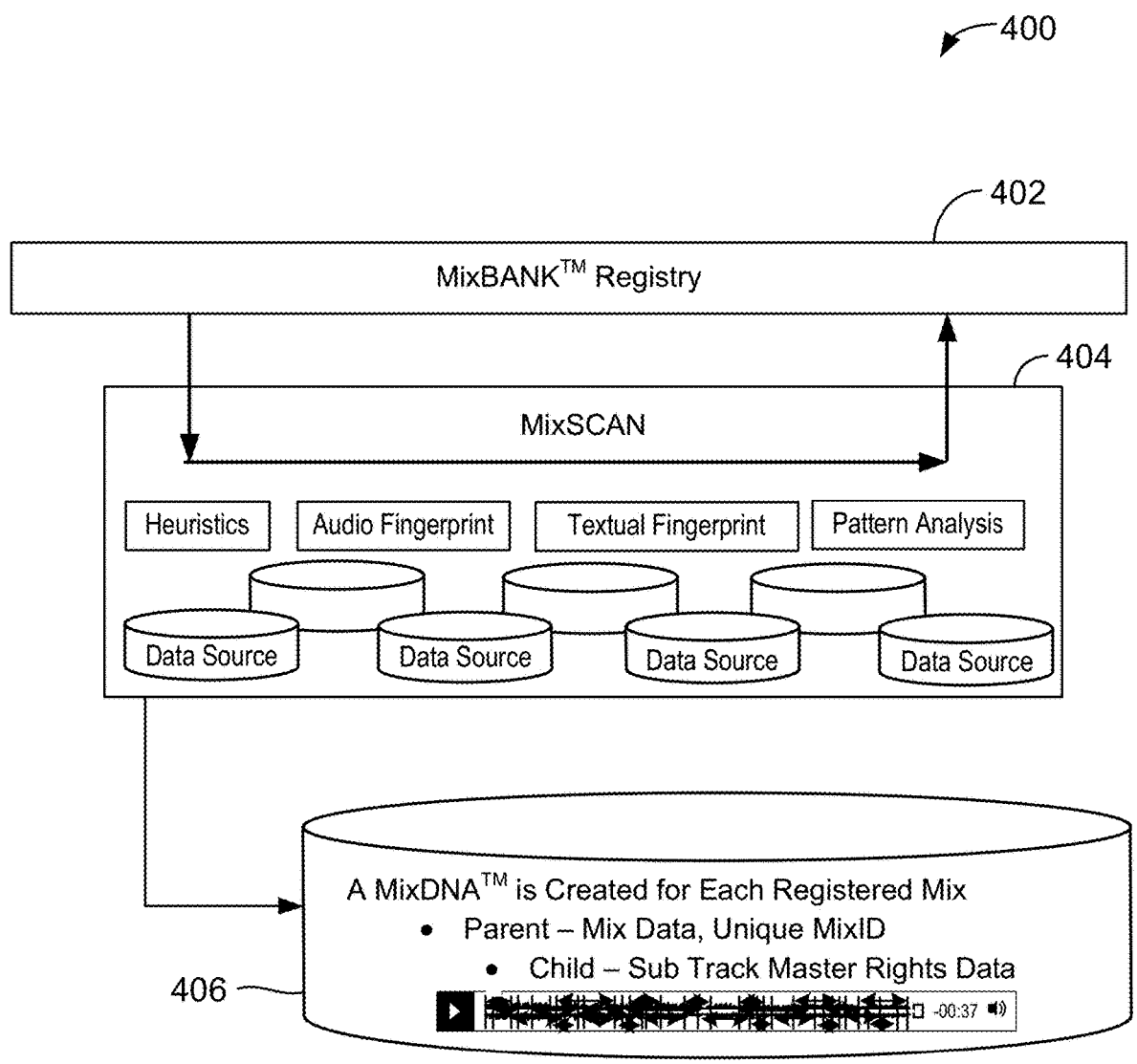
FIG. 4 illustrates an example block diagram of portions of a media content processing system according to various embodiments.

FIG. 4 illustrates an example block diagram of portions of a media content processing system in accordance with various embodiments. The media content processing system 400 may include a media content registry 402, which may contain information regarding media content, and computer-executable code to perform the following functions:

Restful JSON API;
Account Authorization/Validation (using OAuth 2.0);
Submit one or more mixes or remixes
    File
    URL;
Include history file with tracklist info;
Return media content metadata (e.g., tracklist info) for submitted mix or remix;
Return clearance status for submitted mix or remix, with the following statuses:
    Cleared (e.g., rights holder known for all identified content and there are no rules that block it)
    Blocked (e.g., rights holder known for all identified content and there are rules that block it)
    Pending (e.g., rights holder not known for all identified content); and
Provide updates, corrections and takedowns to previously submitted content.

The media content processing system or module may implement a proprietary recognition technology 404 that identifies underlying songs/sound recordings (tracks/titles) used in mixes and remixes. This technology may use a multi-phased approach utilizing both audio fingerprinting and text metadata recognition, as well as pattern analysis and heuristics to enhance music identification (as disclosed in U.S. patent application Ser. No. 16/288,857, filed Feb. 28, 2019, entitled "MEDIA CONTENT PROCESSING TECHNIQUES USING FINGERPRINTING AND HEURISTICS", which is hereby incorporated by reference herein in its entirety). In some embodiments, the media content processing system may have an editorial method as the final stage on some mixes based on popularity of the DJ, mix, external claims, etc.

Once the song segments (portions of the mix/remix each associated with a song/track/title) within a mix/remix are identified, the media content database 406 may then store them as individual media content metadata of the respective mix. Media content metadata may contain the tracklist of songs within that mix and relevant information about each song, including song name, artist name, album name (when available), ISRC (when available), etc. This information may then be used to associate the songs to the rights holders' copyright information for this song(s) in order to clear them against available business rules, and to administer royalty reporting and payments.

As shown in FIG. 4, the media content database may communicate with the other components of the media content processing system, which may organize mixes and remixes into micro blocks (segments) of audio. Additionally, acoustic and textual fingerprinting technologies may be applied to identify the segments of audio. The media processing system may also perform a pattern analysis and heuristics enhance the identification operation. In some embodiments, media content experts (e.g., music researchers) may complete the media content processing, as necessary. Lastly, information about the songs included in the mix/remix may be included and stored in media content metadata.

Figure 5:
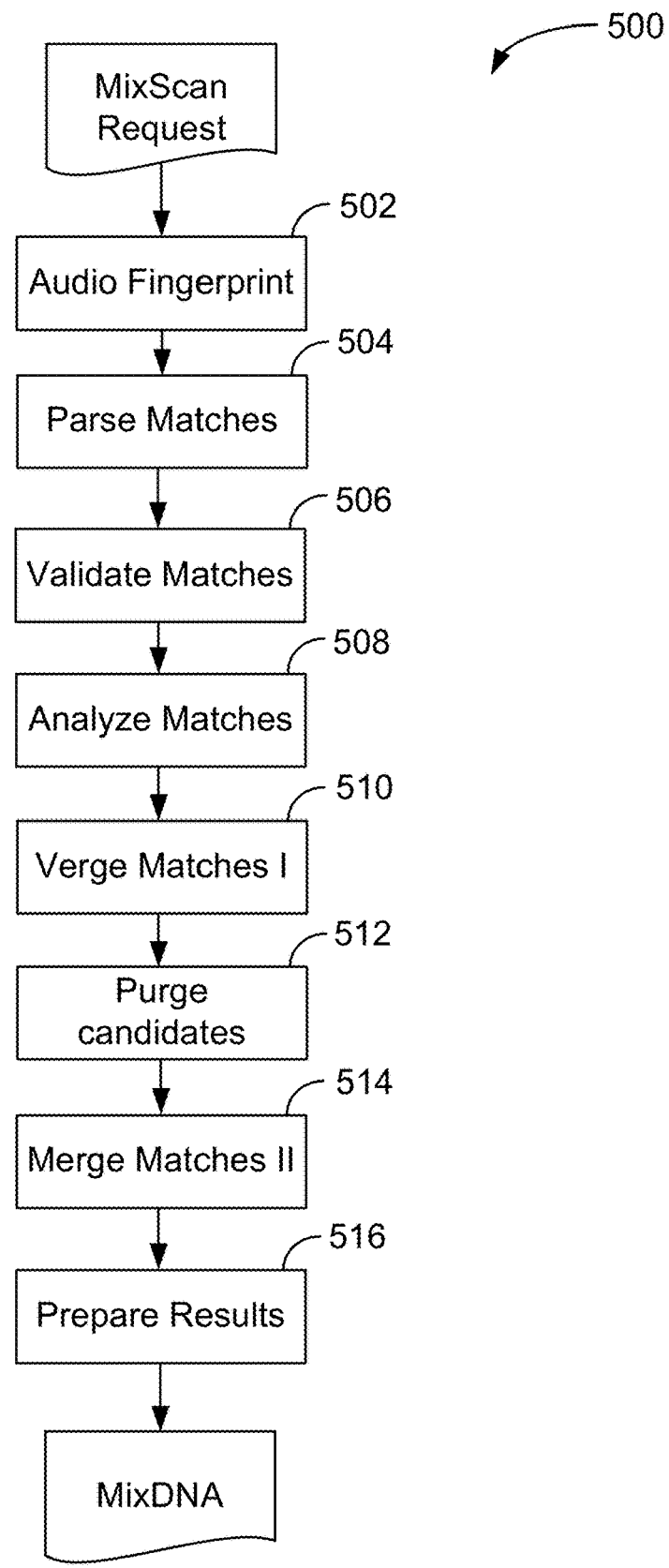
FIG. 5 illustrates an example flow diagram of a technique for processing media content in accordance with various embodiments.

FIG. 5 illustrates an example flow diagram of a technique 500 for processing media content in accordance with various embodiments. As an example, the media processing system may perform the following steps in identifying the segments of media content submitted by the user:

- At (502) Audio Fingerprint—break up the file into micro audio blocks or segments (using history file when available in advance to group the relevant sections), create fingerprints and query fingerprint database for candidate matches;
- At (504) Parse Matches—parse fingerprint candidate matches for processing;
- At (506) Validate Matches—scan parsed results for errors;
- At (508) Analyze Matches—grade responses, use available text data from history files to disambiguate candidate matches, and note time values (duration, position);
- At (510) Merge Matches I—analyze candidate match patterns, identify tracks that are considered the same and merge them;
- At (512) Purge Matches—scan the merged track for candidates that are incorrect;
- At (514) Merge Matches II—scan the track list again for more merging candidates; Optionally, a 2nd pass fingerprinting is performed—where steps 502, 504, 506, 508, 510, 512, and 514 may be repeated on unmatched areas; and
- At (516) Prepare Results—perform final analysis to merge tracks and create media content metadata (e.g., MixDNA).

In some embodiments, the media processing of steps 500 may include an editorial review. For example, music researchers may complete the media content processing on popular DJs, mixes or due to claims. This may be achieved by reviewing the available tracklist details for each song segment within the mix.

FIG. 6 illustrates an example of identified segments of media content in accordance with various embodiments. FIG. 6 shows a display of a user application 600 with mixes/remixes identified using the media content processing system and media content database(s) as described herein. For example, unidentified sections of a mix/remix can be reviewed and manually entered. Song segment duration and metadata can also be reviewed and adjusted. The results may then be stored in media content metadata. Tracklist details for each song segment within the mix or remix may be stored in media content metadata inside the media content database and may be distributed along with the mix or remix to music services, when requested by the music service. Within the media content database(s) a more detailed version may be stored, which includes not only the final metadata about the master recordings (songs/tracks/titles) used in the mix/remix, but also all the candidate matches that were analyzed and contemplated before the final decision was made, the rights holder information, etc.

The version of media content metadata that is distributed to music services (e.g., when requested), along with the mixes and remixes, may include the following information for each of the master recordings (songs/tracks/titles) in the mix/remix. For example:

Track name;
Artist name;
ISRC;
Start/end position within the mix;
Track # (e.g., when available); and
Track duration (e.g., when available).

This information may be provided to help music services display accurate information about the song when it is played within the mix/remix and to enable them to link it to their catalogs within the music service. The latter may enable use cases, such as allowing consumers to listen to the full-length version of the tracks/titles or additional songs from the same artist.

Figure 7:
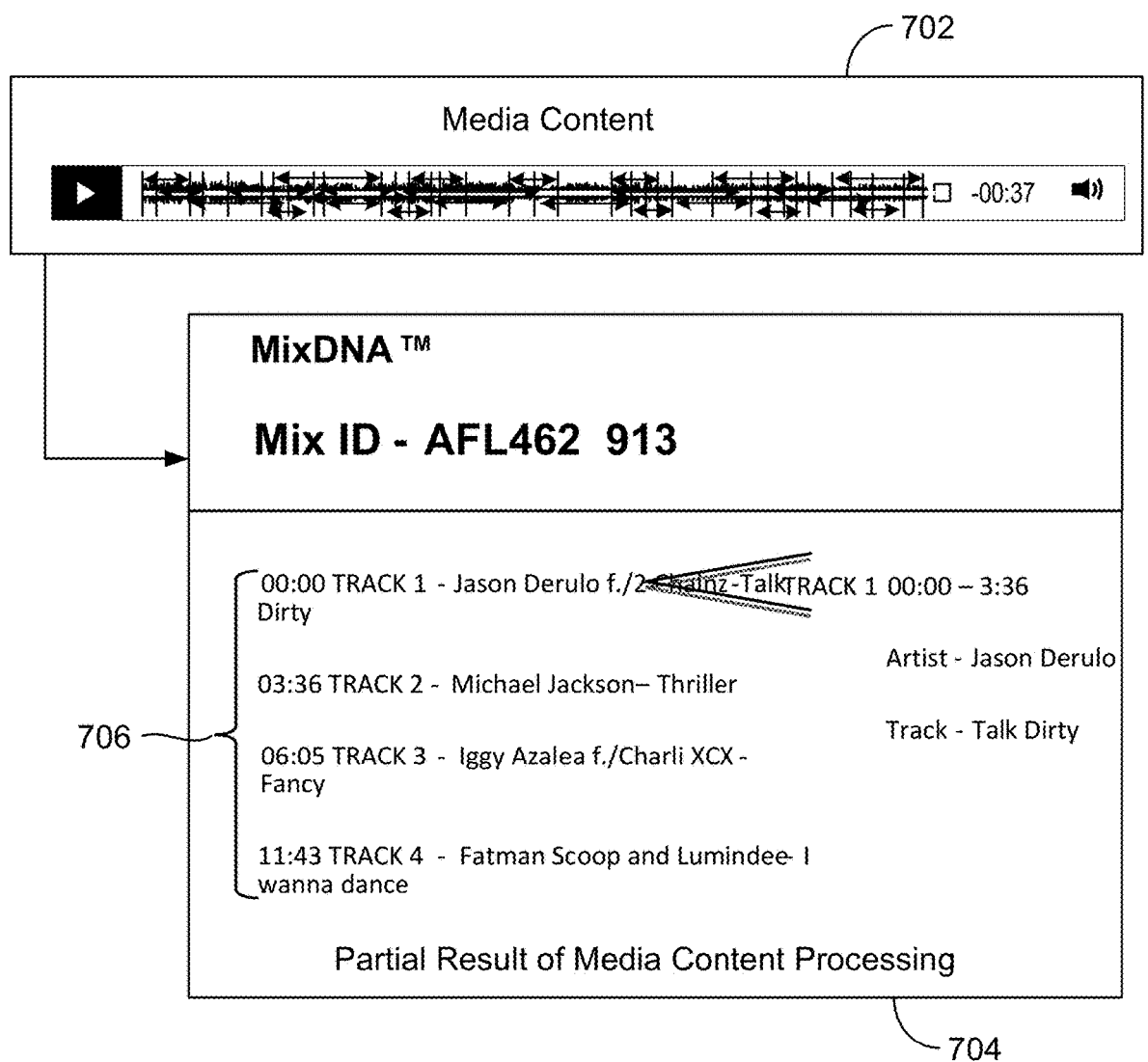
FIG. 7 illustrates an example of identifying segments of media content in accordance with various embodiments.

FIG. 7 illustrates an example of identifying segments of media content in accordance with various embodiments. As discussed above, segments of UGC media content 702 (e.g., a mix/remix) submitted by a user, such as a DJ, may be identified using various fingerprinting and heuristics techniques (as disclosed in U.S. patent application Ser. No. 16/288,857, filed Feb. 28, 2019, entitled "MEDIA CONTENT PROCESSING TECHNIQUES USING FINGERPRINTING AND HEURISTICS", which is hereby incorporated by reference herein in its entirety). The result 704 of processing such segments and media content may include, in part, a list of tracks, artists, times, and durations of media content 706 found to be present within the UGC media content submitted by the user. In addition, identifying segments of media content may include several other processes, including the application of a plurality of business rules created by rights holders per territory. The media content database(s) may provide rights holders control over usage and distribution of their catalogs used within mixes and remixes. According to various embodiments, there may be two ways for rights holders to set rules in the media content database(s): automated and manual.

According to various embodiments, in automated rule setting, the media content database(s) may be designed to use already created industry standards to help rights holders automate the process and reduce the amount of work they have to do to create business rules. Using music as the media content as an example, the DDEX ERN specification is an example of industry standards. While the publishing community may not have officially standardized DDEX ERN, the major record labels, larger Indie labels, and distributors have standardized the specification. DDEX ERN includes territory rights, license information, and other rules that labels include in catalog feeds to music services. The media content database(s) may detect such rules during ingestion and apply them automatically to recordings.

The media processing system may also provide a CWR and/or CSV file template for labels and distributors who do not support DDEX ERN specification and can make similar use of it to automate aspects of the business rules creation. Publishers may also use CWR and CSV file approaches for business rules creation. Territory information and ownership splits (percentage owned by a composer of a specific composition) may be automated using the business rules.

According to various embodiments, in the manual rule setting, the media content database may also provide rights holders additional capabilities/controls within their account dashboards to set business rules. Such capabilities/controls include:

Blacklist Control—globally blacklist artist, song, songwriter or composition from use in mixes;

Territory Control—prevent rights holder music from being used or distributed by territory;

Track Control—limit the number of instances rights holder music can be used per mix;

Remix Control—control the use of songs within remixes;

Mix Control—control the use of songs within mixes;

Duration Control—control how much of the original song can be used within a mix

DJ Control—blacklist DJs from using rights holder content; and

DSP Control—prevent rights holder music from being distributed to service providers (e.g., DSPs).

According to various embodiments, the media content processing system may also perform clearance and distribution. As part of the clearance process, the media content processing system may validate the mix/remix. Validation may include three key points that have to be satisfied in order to validate the mix/remix and clear it for distribution. These points may be satisfied by answering the following inquiries: First, are all rights holders known for sound recordings used in the mix/remix?; Second, are there any business rules that prevent the mix/remix from being distributed?; and Third, if it is a mix, have we identified the minimum match duration?

Once the sound recordings (tracks/titles) used in mixes or remixes are identified, the media content database may associate them with the rights holder copyright information. The rights holder copyright information may be used to see if there are any rules set by the rights holders that prevent or limit distribution of mixes/remixes with their master recordings (songs/tracks/titles).

In an embodiment, there may be three states, pertaining to the rules set by the rights holders, to which a mix/remix can be assigned. These states include:

BLOCKED—If a business rule exists that prevents the mix from distribution, it is marked as blocked and will not be distributed to any music service, a specific music service, or a territory;

PENDING—If a master recording is identified but the rights holder information is not known to us, the mix/remix will be marked as pending. Pending content is not distributed unless the content clearance policy is satisfied (e.g., clearance satisfies a threshold); and CLEARED—If there are no business rules that block or limit the mix from distribution, it is marked as cleared, an ISRC is assigned and it is put in a queue for distribution.

However, if at any point business rules are changed, added or deleted, all registered mixes and remixes may be reassessed and their state may be modified accordingly. Affected items that were previously distributed may be issued takedowns with music services or updated information may be provided, as needed. Items that were blocked previously may be cleared as a result of rule changes.

Lastly, the durations for each identified song segment of the media content (as discussed above with reference to the foregoing figures) within the mix/remix may be determined and added to get the total duration for identified segment. If the total duration is equal to or greater than the minimum required percentage of the overall mix/remix duration, the mix/remix may be eligible for distribution. In some embodiments, an editorial review may be performed, as needed, on mixes/remixes from popular DJs to ensure that they meet the minimum duration criteria to be distributed.

In distribution, according to various embodiments, uploaded mixes and remixes may be assigned an ISRC to allow them to be made available commercially and once cleared may be marked for distribution. The default protocol for distributing mixes/remixes is DDEX ERN, as discussed above. This protocol includes delivery of the digital assets, the unique mix ID and ISRC, which may each be unique and which may be assigned to each mix or remix, any associated mix/remix metadata, and artwork. Territory rights, takedowns, corrections, and other supported commercial details may be communicated via DDEX ERN as well.

According to various embodiments, the media content processing system may also include reporting services. For example, music services may be contractually obligated to provide media content consumption reports in order for the media content processing system to report and administer royalties to the rights holders.

Unlike traditional royalty payments, whereby a play is tallied after a brief listener auditing period (e.g., usually 30-45 seconds), mix/remix royalties may be calculated on blocks of time individual listeners have actually listened to a mix/remix. As such, the media content processing system may modify its reporting from music services to track all plays to, e.g., a 1-second granularity. For example, music services may report to the media content processing system all mix/remix plays per subscription type, per territory. For each mix/remix, a start and end time of the mix/remix play may be included.

The media content processing system may utilize the media content metadata information to calculate how much of each song segment within the mix/remix (submitted to the media content processing system by the user) was actually played by a DSP. All song segment plays for a song may be added to get the total amount of time a song (track/title) was played. That total amount of time may then be divided by an average song length (e.g., by 4 minutes 20 seconds) to get the actual play counts, including any partial plays that are left over.

Once the length of each song segment used in the mix/remix (e.g., media content) is known, the media content processing system may apply the appropriate asset estimation model. For example, a media content license may be considered the asset pertaining to the media content, and the asset estimation model may be based on values within the license. Alternatively, a media content intellectual property monetization tool may be considered the asset pertaining to the media content, and the asset estimation model may be based on values within monetization tool. In addition, an agreed business model (e.g., per stream, per user, or revenue share) may be applied to generate the required reports for the rights holders, to compute the royalty payment amounts, and for payment of the royalties. For example, a rights holder may get paid based on the portion of the played media content that they own out of the total duration of a mix play, using the average song length, described above, to determine the number of song plays that the mix contained. As another example, an asset estimate (i.e., value of an asset, such as a media content license, to a rights holder) may be calculated based on the duration of portions of the Digital Streaming Provided (DSP) played media content that the rights holder owns within the UGC media content mix/remix played by the DSP, divided by an average media content length, similar to what is described above. This may be used to determine how many media content plays (or portions thereof) the UGC media content mix/remix contained. That number may be multiplied by a royalty rate to determine the total value of the asset or a royalty payment due to the rights holder.

Remixes may be treated in the same way as other sound recordings in a music service (e.g., a DSP) and/or within the media content processing system. For example, 30-45 second sample plays of a remix may be allowed, for example, free of charge and without having to update the reporting, depending on music services (e.g., DSPs) existing agreements with the rights holders. The media content processing system may process remix reports and administer royalty payments to the rights holders on behalf of the music service.

According to various embodiments, the media content processing system may provide Secure Account Management services. The media content processing system may also provide convenience for individuals and entire organizations to sign on to the media content processing system platform to administer their content. Each organization may have their own dashboard (user interface that presents information), which may be customized to their organization type, with relevant views, and functionality. Each organization also may have multiple roles (e.g., member, admin, and/or owner), depending on the level of permissions that a user needs or is allowed to be assigned.

In addition, the Secure Account Management services, according to various embodiments, may allow for: 1) Self-managed DJs to upload their own tracks, while a manager may be managing the catalog of several DJs, and to view reports on usage, consumption and revenue information; 2) Rights holders to have master accounts with the ability to assign multiple logins with various permission tiers to manage their repertoire and business rules, to see account information, to perform various internal administrative tasks for their whole roster or specific labels or publishers on their roster, and to view reports on usage, consumption and revenue information; and 3) Music services to create new program offers and financial terms for rights holders to approve or to manage multiple programs as bundles.

In another embodiment, the media content processing system may provide Rights Holder Catalog Ingestion services. With such services, the media content processing system may request information from rights-holder partners in order to properly connect songs used in mixes and remixes to the appropriate parties in order to accurately identify rights holder content and allocate/distribute royalty payments. Information may also be requested to manage and update business rules for compliance on a timely basis.

For example, standard commercial metadata may be delivered by labels via: 1) Full DDEX ERN, delivered directly through normal supply chain or a data aggregation partner (e.g., such as MediaNet); 2) Use of CSV or other file template if DDEX ERN is not supported; and/or 3) Direct phone or email contact with account representatives can handle edge-case additions, takedowns, rights collision management, etc.

Figure 8:
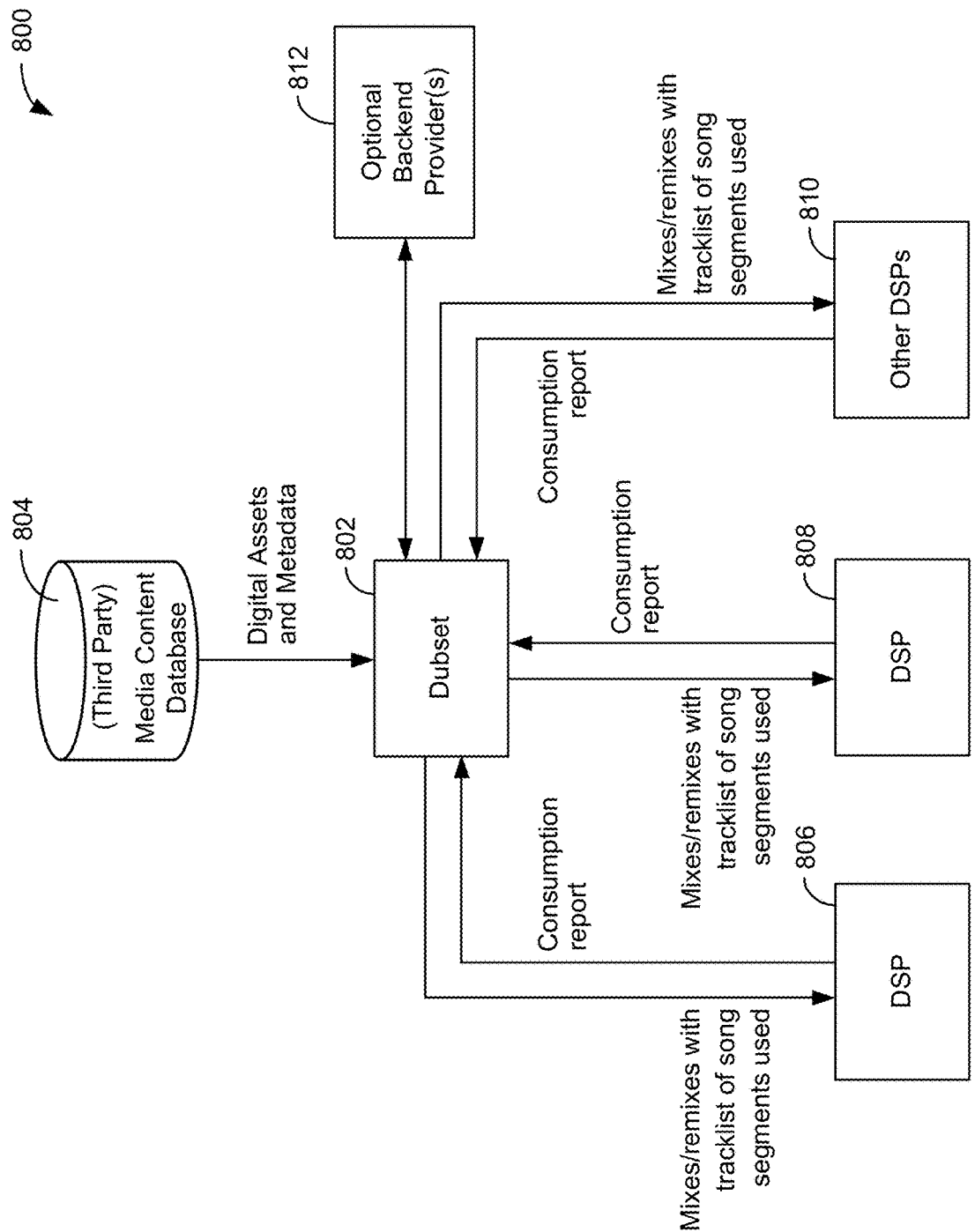
FIG. 8 illustrates an example overview block diagram of a portion of a media content processing system in communication with other media content entities in accordance with various embodiments.

FIG. 8 illustrates an example overview block diagram 800 of a portion of media content processing system 802 in communication with other media content entities in accordance with various embodiments. Media content processing system 802 may be in communication with one or more media content databases 804. The media content database(s) 804 may store media content, digital assets (e.g., media content licenses), metadata pertaining to digital content, among other such information pertaining to media content. The media content database(s) 804 may pass this information as information provided for media content along with possibly other information, as described above, to any portion of media content processing system 802. In addition, any portion of media content processing system 802, may communicate such information, along with the results of media content processing (e.g. results relating to mixes/remixes with tracklists of song segments used in the mixes/remixes), to DSPs 806, 808, and/or 810. Moreover, DSPs 806, 808, and/or 810 may pass information (e.g., reports, including royalty/revenue reports) back to any portion of media content processing system 802. Optionally, one or more backend provider(s) 812 may send or receive information pertaining to media content to or from any portion of media content processing system 802.

As discussed above, various information pertaining to media content may be sent between and among media content database(s) 804, any portion of media content processing system 802, DSPs 806, 808, 810, and any other backend provider(s) 812. Examples of such information pertaining to media content (e.g., mixes/remixes) may include:

1. Song, artist and album names appearing during business rule creation
   a. Labels and publishers can only access and create rules for songs, artist and albums in their respective catalogs;
2. Song and artist names that may be displayed in mix and remix detail view pages, in the media content metadata (e.g., tracklist)
   a. Information including start time within the mix
   b. Information including end time within the mix
   c. Labels, publishers and DJs/content creators are able to view the tracklist details and suggest corrections to the media content processing system to investigate and validate
   d. Also displayed during playback;
3. Song, artist, genre, label, release date and key that may be displayed in the "marketplace" section of a dashboard where pre-cleared tracks and stems information may be displayed for DJs/content creators to view (as used herein, stems are an open multi-track audio format, and a stem file typically contains a track split into four (or possibly more) musical elements such as a drums stem, a bassline stem, a melody stem, and a vocal stem, for example)
   a. Stems may be included when provided;
4. Song and artist information available to the labels and publishers, in mix/remix data exports, as part of the included media content metadata (e.g., tracklist)
   a. Includes start time within the mix
   b. Includes end time within the mix
   c. Mix/remix exports are available only to those labels and publishers whose data is used in those mixes and remixes;

5. Song, artist, and ISRC information available in media content metadata when mixes/remixes are delivered to DSPs.
   a. Includes start time within the mix
   b. Includes end time within the mix;
6. Song, artist, and ISRC information available in reports to the labels and publisher
   a. Includes territory played in
   b. Includes total duration played
   c. Include play counts
   d. Limited only to catalogs owned by the label or publisher; and
7. Reports
   a. Number of streams per territory
   b. Top DJs streamed with label content
   c. Top mixes/remixes streamed with label content
   d. Total duration
   e. Revenue per territory
   f. Revenue per DJ
   g. Revenue per mix/remix
   h. Revenue per song
   i. Revenue per artist
   j. Limited only to the catalogs owned by the label or publisher
   k. Limited only to content used within the mixes/remixes by the DJ.

In order to provide security in the media content processing and related transactions, the media content processing system may include a particular set of media content database services as a part of media content database(s) 804. The media content database services may be built on a third-party platform (e.g., making uses of third-party media content database(s) 804) and use the third-party's platform services and thus benefit from security measures built into third-party platforms. The media content database service may include, for example, network firewalls and web application firewall capabilities. The media content processing system may create private networks and may strictly control access to instances and applications (including those operating on the media content processing system), for example, by utilizing security functionality of third-party platforms. The media content database service may include, for example, encryption for files in transit with transport layer security (TLS) deployed across all media content processing system services. The media content database service may include, for example, encryption methods for any files at rest (stored in e.g., the media content database), e.g., implemented with third-party platform management services. As a security measure, all unused TCP/IP ports may be closed and WAN access may be blocked. Further, an IP access list may be implemented and automatic blacklisting of IP addresses and usernames may be enabled. Yet further, access may be allowed only through dedicated connections from locations specified by those managing the media content database(s) and processing system. Additionally, IP whitelisting may be enabled on each of the media content processing system servers. The media content database service may include, for example, fully enabled built-in DDOS protection. The media content database service may include, for example, multi-factor authentication (MFO) enabled for all services in the media content database and/or a security token that may be generated upon every login attempt. The media content database service may include, for example, security roles, login levels, and procedures. The media content database service may include, for example, alert notifications, e.g., for any potential security issues, which may be provided using third-party platform services.

Figure 9:
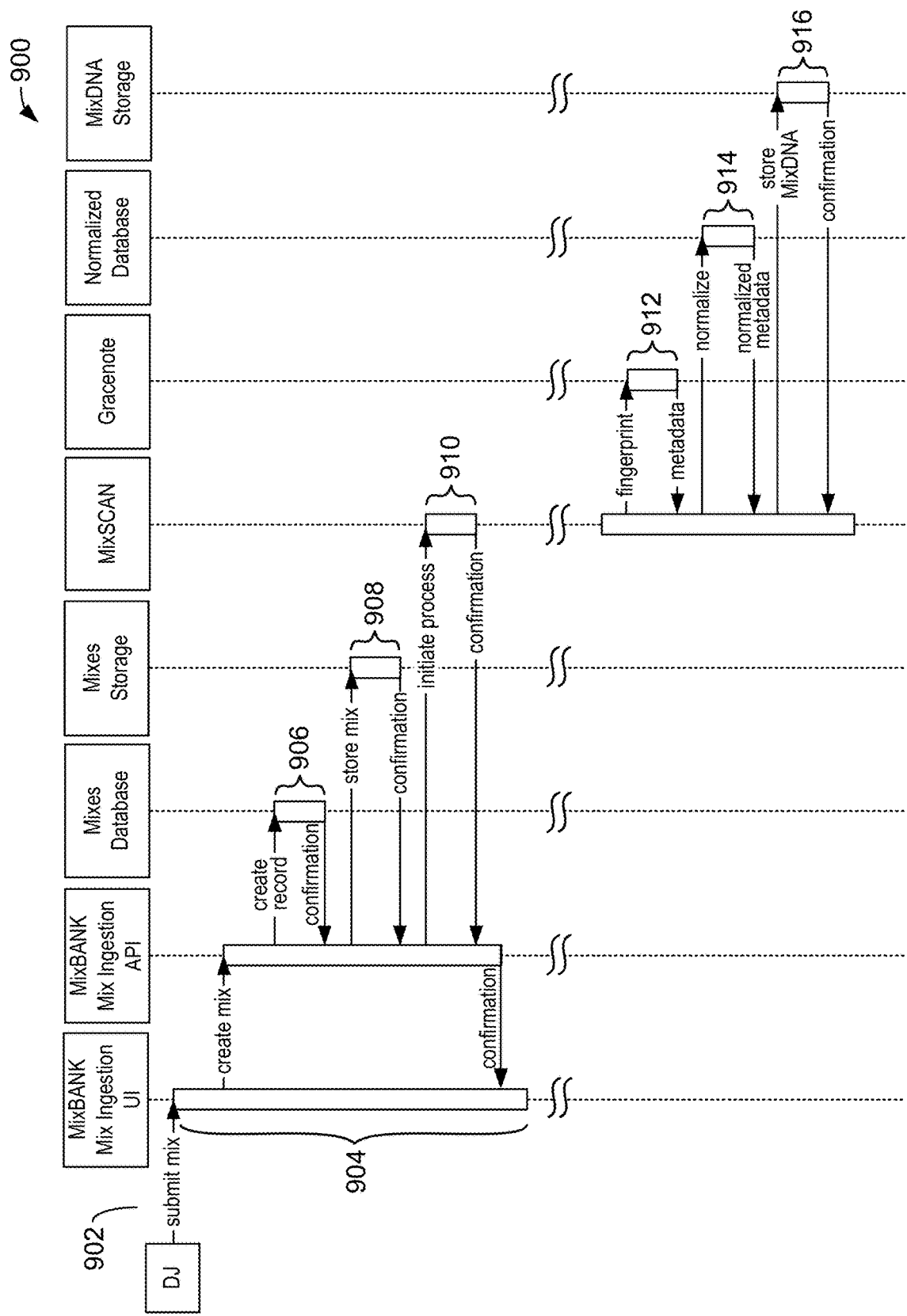
FIG. 9 illustrates an example flow diagram of techniques for identifying segments in media content in accordance with various embodiments

FIG. 9 illustrates example flow diagram 900 of techniques for identifying segments in media content in accordance with various embodiments. The media content processing system may perform a mix submission and identification process, in which the underlying tracks/songs in the segments of the media content are identified, as well as the rights holders associated with the tracks/songs. The identification of segments of media content (e.g., tracks and songs used in mixes) may include audio fingerprinting and/or heuristic rules, and may involve scanning at various lengths of segments. For example, with music, segments of tracks may be identified in increments of seconds to minutes long, and may depend on the entire length of the mix.

Flow diagram 900 may include several steps. At 902, a mix/remix may be submitted by a user (e.g., a DJ) to one or more parts of a media content processing system. At 904, the mix may be ingested and thus registered/created with an application programming interface (API) in the portions of the media content processing system, and a confirmation may be sent back to the user. At 906, a record may be created, e.g., via the API, in the media content database(s) with respect to the mix/remix, and a confirmation may be sent to the API. At 908, the mix/remix may be stored, e.g. via the API, in the media content database and a confirmation may be sent to the API. At 910, the media content processing system may process the mix/remix after being initiated, e.g. via the API, and a confirmation may be sent to the API. At 912, one or more mix/remix fingerprints may be generated by a scanning process (e.g., by producing segments from the mix/remix, and analyzing the segments via acoustical and/or textual and/or other processing). In addition, one or more media content databases (including third-party databases) may be searched using the mix/remix fingerprints to determine, and send back to the media content processing system, metadata associated with the media content (songs/tracks/titles) in the mix/remix. At 914, the metadata may be normalized (i.e., reduced to a predetermined standard form of metadata) using one or more normalized media content databases (including third-party databases), and the normalized metadata may be returned to the media content processing system. At 916, the normalized metadata, which may identify the one or more songs/titles/tracks of media content in the mix/remix may be stored in one or more media content databases (which associates the metadata with the mix/remix), and a confirmation may be sent to the media content processing system.

Figure 10:
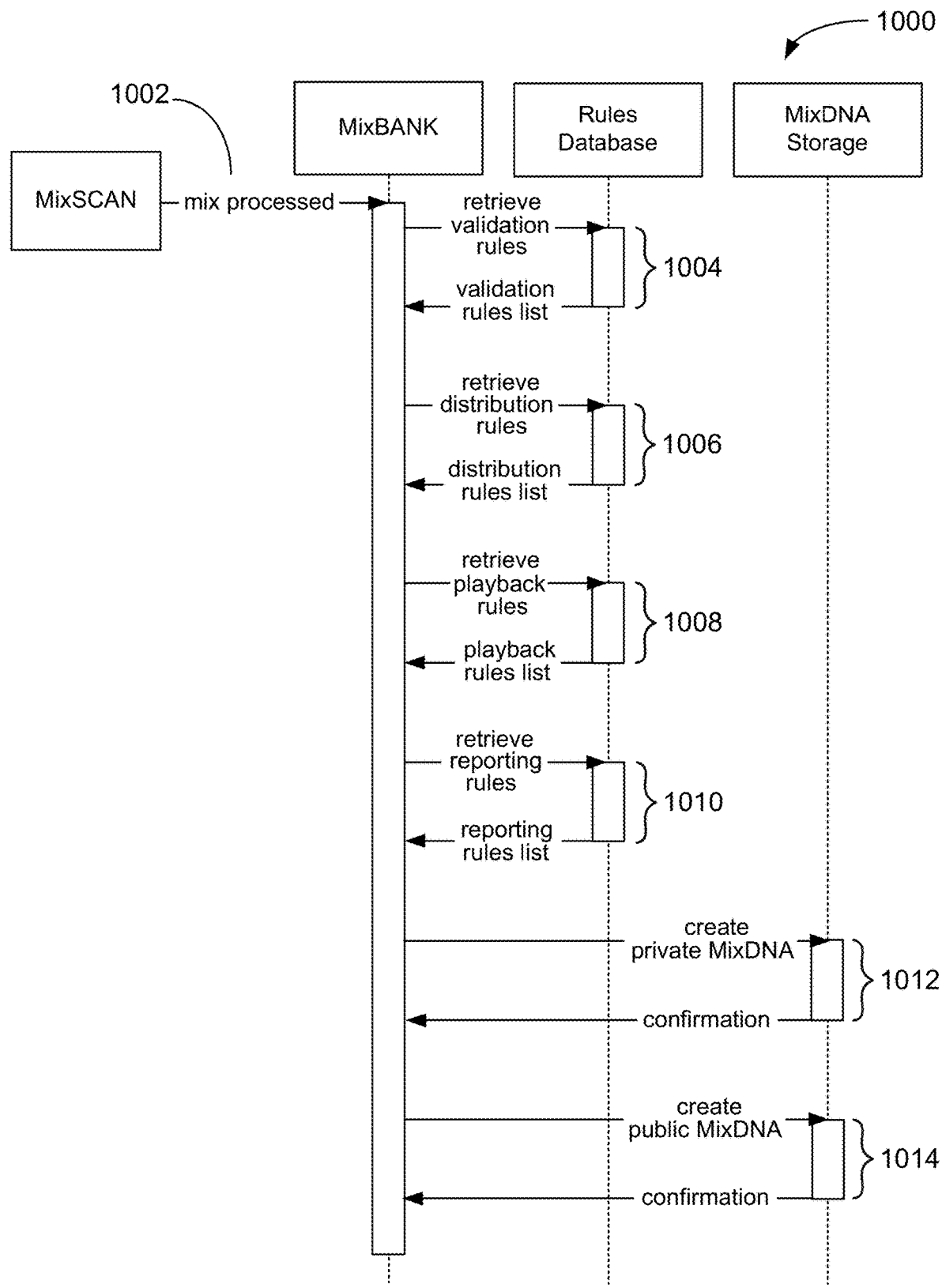
FIG. 10 illustrates an example flow diagram of techniques for processing segments in media content in accordance with various embodiments.

FIG. 10 illustrates an example flow diagram 1000 of techniques for processing segments in media content in accordance with various embodiments. The media content processing system may perform a mix validation and clearance, in which the segments in the UGC media content are validated and cleared for the user to use within the UGC media content (e.g., mix/remix) for each territory that the mix may be eligible for, for example, based on the overlap of available territories from each song segment. In some embodiments, a user may submit a proposed list of existing media content (e.g., tracks/titles belonging to another rights holder) of which the user intends to use segments within his or her UGC media content (e.g., mix/remix). As such, clearance may be performed before creation or use of such segments of media content (e.g., songs/tracks/titles belonging to another rights holder). For example, a DJ may submit to the media content processing system a proposed list or tracks or songs that the DJ intends to use in a mix or remix. The media content processing system may then run a clearance on the tracks and provide a licensing estimate for the DJ to review prior to creating a permanent record of the mix/remix or uploading media content to the media content processing system. As such, the user may modify which segments of media content (e.g., song/tracks/titles) to use in creating his or her UGC media content.

Alternatively, clearance may be performed after a user has uploaded the UGC media content to the media content processing system but before distribution of the UGC media content. When the clearance of the UGC media content satisfies a threshold, the UGC media content may be cleared for distribution upon the user approving and paying the asset estimate (e.g., licensing or royalty payment plan). For example, a user such as a DJ may upload a mix that uses segments from a number of tracks. The media content processing system may identify the rights holders of all the tracks used in the mix, determine which tracks are cleared and the associated licensing fees, and then notify the user. In some cases, the media content processing may identify the tracks that were not cleared to the user.

In flow diagram 1000, at 1002, an uploaded mix/remix may be processed by the media content processing system to produce normalized metadata (pertaining to the tracks/titles used in the mix/remix), which may be transmitted to one or more of the other components of the media content processing system. At 1004, the media content processing system may request, from one or more rules databases (which may be a part of the one or more media content databases or separate entities), validation rules and may receive from the database(s) a validation rules list. At 1006, the media content processing system may request, from one or more rules databases, distribution rules and may receive from the database(s) a distribution rules list. At 1008, the media content processing system may request, from one or more rules databases, playback rules and may receive from the database(s) a playback rules list. At 1010, the media content processing system may request, from one or more rules databases, reporting rules and may receive from the database(s) a reporting rules list. The validation, distribution, playback, and reporting rules lists may be used to determine the appropriate use of, and payment for, the tracks/titles used in the mix/remix. At 1012, the media content processing system may request, from the media content database(s), the creation of private metadata, which includes the various rules lists, and which pertains to the uploaded mix/remix. It may also receive confirmation of the creation of such private metadata. At 1014, the media content processing system may request, from the media content database(s), the creation of public metadata, which includes the various rules lists, and which pertains to the uploaded mix/remix. It may also receive confirmation of the creation of such public metadata.

Figure 11:
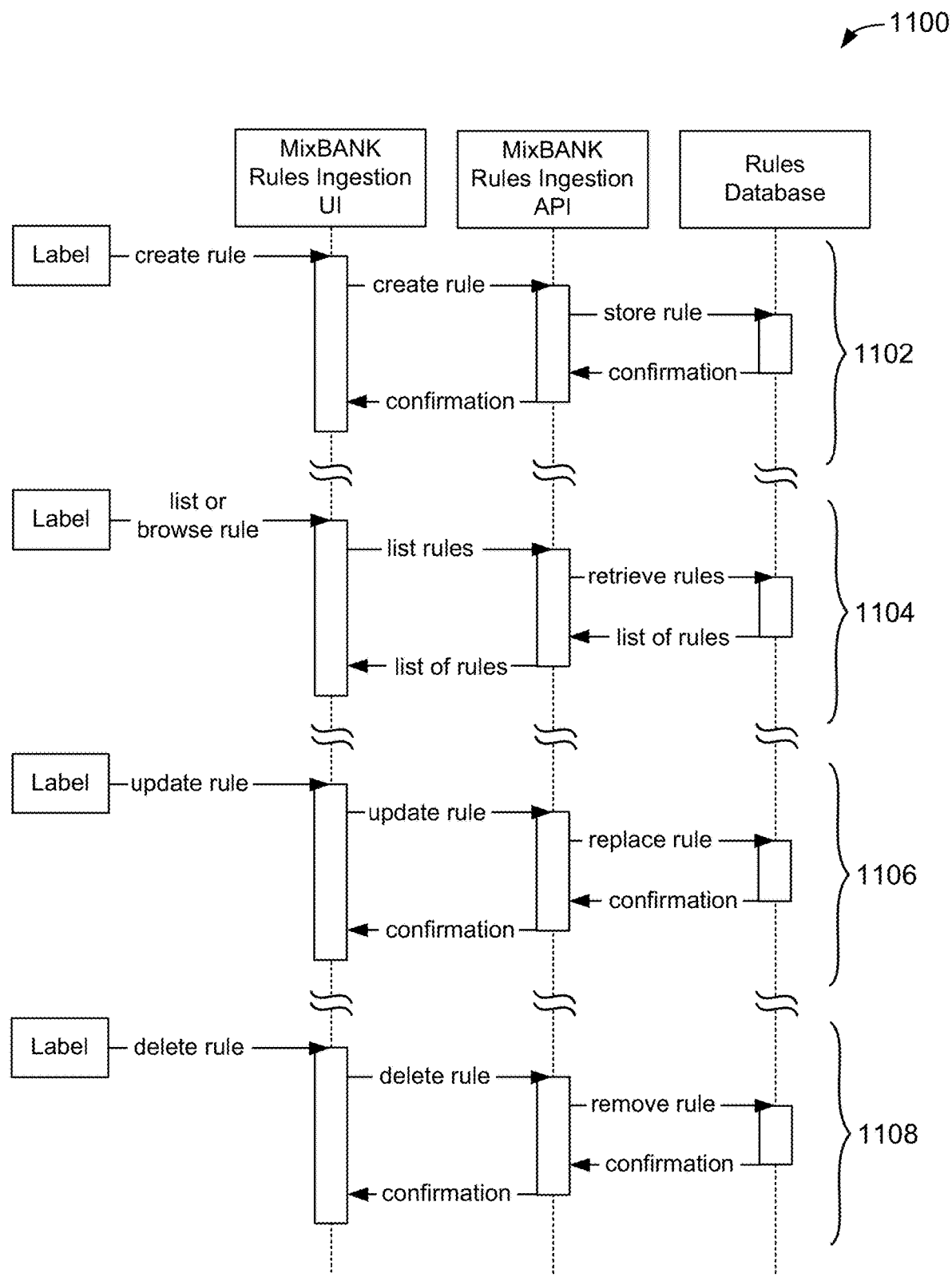
FIG. 11 illustrates an example flow diagram of techniques for managing rules associated with segments in the media content in accordance with various embodiments.

FIG. 11 illustrates an example flow diagram 1100 of techniques for managing rules associated with segments in the media content in accordance with various embodiments. The media content processing system may perform rule ingestion to create rules and apply the rules in order to determine what asset rights (e.g., copyrights, licensing rights: composition, recording, performance, etc.) are associated with the identified segments of UGC media content. In some embodiments, the media content processing system may create and maintain its own centralized registry of media content and the associated rights holders. In other embodiments, the media content processing system may be operatively coupled to and in communication with an external entity having such a database of media content, for example, a governmental copyright database, or an independently operated database or media content provider (e.g., publishers, labels, etc.). At 1102, one or more rules may be created, and they may be stored by the media content processing system in the one or more media content databases, and/or the one or more rules databases. Such rules may be created using a rules user interface and an API, which may each be a part of the media content processing system. At 1104, one or more rules may be listed or browsed by using the media content processing system to retrieve such rules from the one and/or more media content databases, and/or the one or more rules databases. Such rules may be listed and/or browsed using a rules user interface and an API, which may each be a part of the media content processing system. At 1106, one or more rules may be updated by using the media content processing system to replace such rules in the one and/or more media content databases, and/or the one or more rules databases. Such rules may be updated using a rules user interface and an API, which may each be a part of the media content processing system. At 1108, one or more rules may be deleted using the media content processing system to remove such rules from the one and/or more media content databases, and/or the one or more rules databases. Such rules may be deleted using a rules user interface and an API, which may each be a part of the media content processing system.

Figure 12:
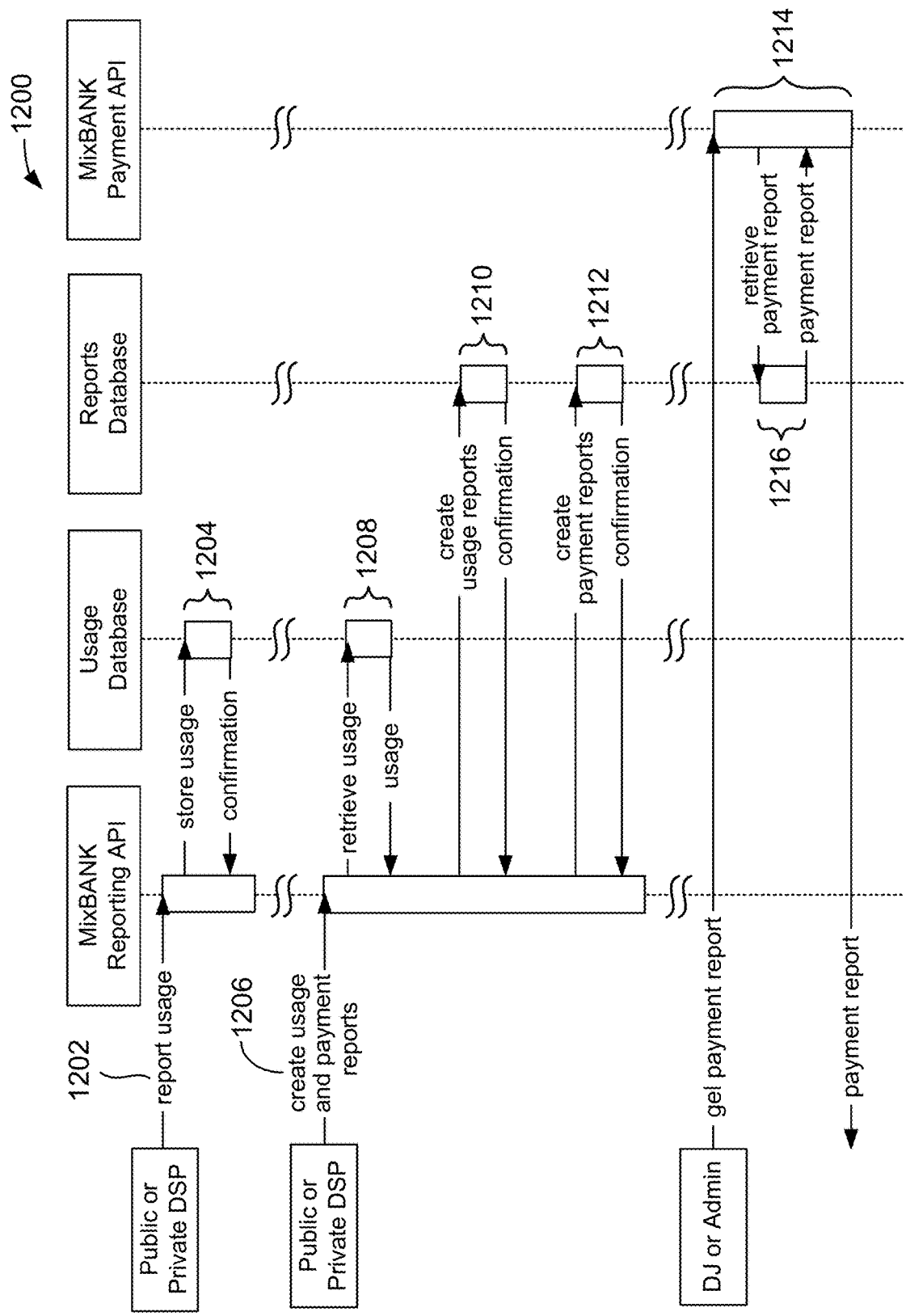
FIG. 12 illustrates an example flow diagram of techniques for providing an asset estimate associated with segments in media content in accordance with various embodiments.

FIG. 12 illustrates an example flow diagram of techniques for providing an asset estimate associated with segments in media content in accordance with various embodiments. The media content processing system may generate reports and an asset estimate, which defines the payment plan for the DJ to obtain the asset rights associated with the segments of their UGC media content (e.g., mix/remix). An asset estimate may include a payment plan for obtaining licensing rights or for royalties to use segments of UGC media content owned by other rights holders. In some embodiments, an asset estimate may be based on a length of the segment(s). In other embodiments, royalty payment may be based on whether an associated segment of UGC media content is actually played. For example, a rights holder may receive royalty payments only for the length of the segment of the UGC media content that is played. However, if their segment(s) of the UGC media content are not actually played by users, then the rights holder may receive a minimal or no royalty payment or other asset payment. At 1202, a music service (e.g., a DSP) may report, using an API, to the media content processing system, usage of UGC media content (e.g. mix/remix) by a consumer of the UGC media content. At 1204, the report may be stored using one or more media content databases, and a confirmation of the storage of the report may be sent to the media content processing system. At 1206, a music service (e.g., a DSP) may make a request, using an API, for the creation of a usage and payment report. At 1208, the media content processing system may retrieve the usage (e.g., an aggregate of the usage reported at 1202) from the one or more media content databases. At 1210, the media content processing system may create a usage report and store it in one or more reports databases (which may be a part of the media content database(s)), and may receive confirmation of the creation of the usage report. At 1212, the media content processing system may create a payment report and store it in one or more reports databases (which may be a part of the media content database(s)), and may receive confirmation of the creation of the payment report. At 1214, a user, such as a DJ or an administrator, may request from the media content processing system a payment report via an API, and may receive such a report. At 1216, the request for the payment report may be forwarded to one or more reports databases, and the payment report may be retrieved to be forwarded to the user.

Figure 13:
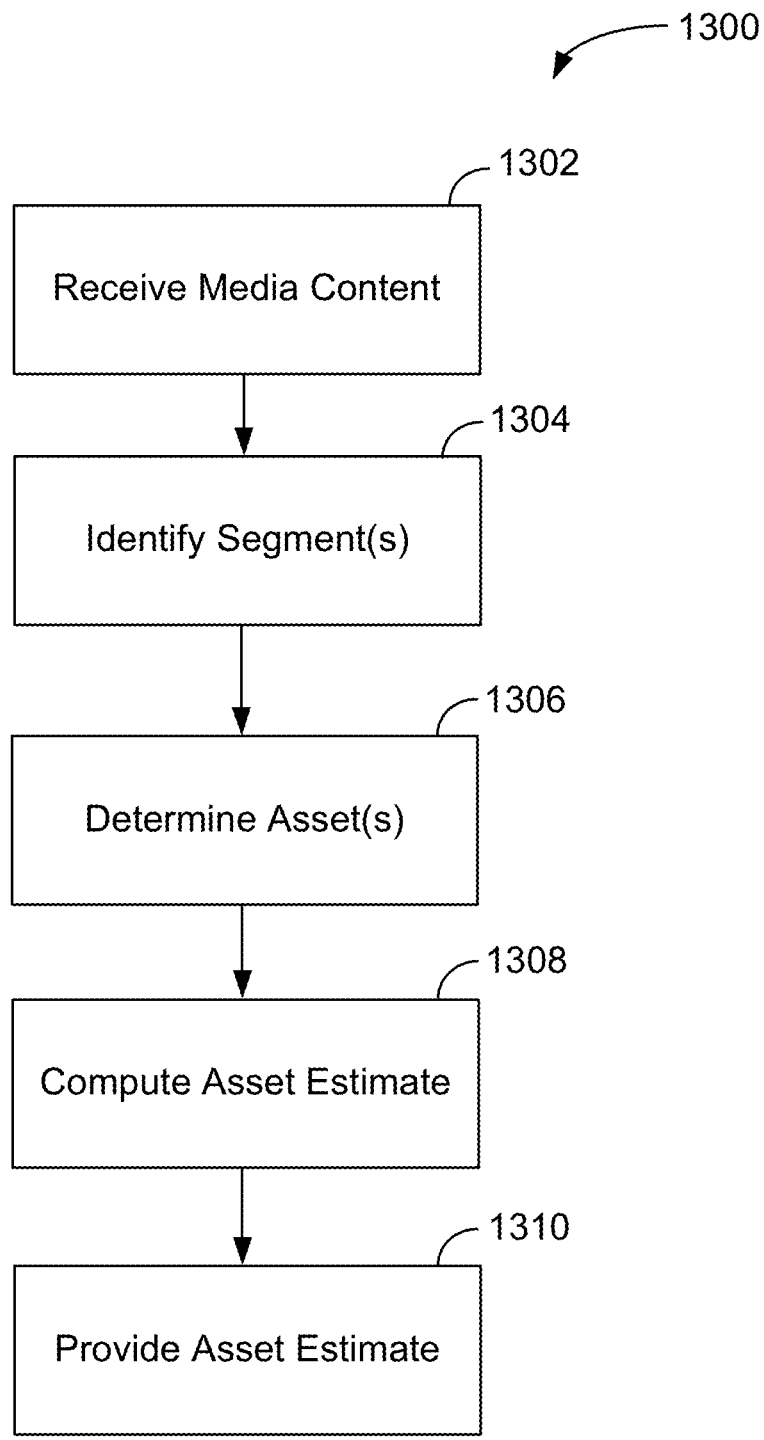
FIG. 13 illustrates an example flow diagram of a computer-implemented technique of processing media content in accordance with various embodiments.

FIG. 13 illustrates an example flow diagram 1300 of a computer-implemented technique of processing media content in accordance with various embodiments. At 1302, UGC media content may be received, e.g., from one or more sources. At 1304, one or more segments of the UGC media content may be identified by looking up the segments in the media content database(s). This may involve performing a scan of the UGC media content over a period of time, detecting one or more fingerprints of the scan (e.g., acoustic or textual fingerprints), comparing the one or more fingerprints to data in the media content database(s), and identifying the one or more segments of media content based in part on the fingerprint(s) matching the data in the media content database(s). At 1306, at least one asset (e.g., a media license or other Intellectual Property asset), associated with the identified one or more segments of media content, may be determined based on the looking up the segments in media content database(s). At 1308, an asset estimate may be computed for the at least one asset associated with the identified one or more segments of the UGC media content. The asset estimate may be indicative of a value of the asset, and it may be based on an average media content length. In particular, the asset estimate may be based on the duration of the identified one or more segments of the UGC media content divided by the average media content (e.g., song/track/title) length. In addition, computing the asset estimate may include determining a number of times that the identified one or more segments of the media content has been played based on information in a report generated where the identified one or more segments of the media content are played. The report may be generated based on a business model including one or more of a per stream model, a per-user model, and a revenue share model. At 1310, the asset estimate may be provided to the one or more sources of media content.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one processor (central processing unit, CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for processing media content, comprising:
    receiving media content from a source;
    identifying one or more segments of the media content via a lookup of the one or more segments of the media content in a content database;
    determining at least one asset and at least one corresponding rights holder associated with the identified one or more segments of the media content based at least in part on the lookup;
    determining one or more use territories for the at least one asset;
    determining a compliance status with respect to one or more clearance policies, the one or more clearance policies being associated with at least one of the source or a distributor, the one or more clearance policies including one or more rules associated with distribution restrictions, wherein the compliance status corresponds to a level of compliance with the one or more rules;
    determining the compliance status exceeds a threshold level of compliance with the one or more rules;
    providing the compliance status to the source;
    computing an asset estimate, based at least upon the at least one corresponding rights holder and the one or more use territories, for the at least one asset associated with the identified one or more segments of the media content; and
    providing the asset estimate to the source of the media content.

2. The computer-implemented method of claim 1, wherein the at least one asset is a license.

3. The computer-implemented method of claim 1, wherein the asset estimate is a value of the asset.

4. The computer-implemented method of claim 1, wherein identifying the one or more segments of the media content comprises:
    performing a scan of the media content over a period of time;
    detecting a fingerprint of the scan;
    comparing the fingerprint of the scan to data in the content database; and
    identifying the one or more segments of the media content based at least in part on the fingerprint of the scan matching the data in the content database.

5. The computer-implemented method of claim 1, wherein the asset estimate is based on an average media content length.

6. The computer-implemented method of claim 5, wherein the asset estimate is based on a duration of the identified one or more segments of the media content divided by the average media content length.

7. The computer-implemented method of claim 1, wherein the computing an asset estimate includes determining a number of times that the identified one or more segments of the media content has been played based on information in a report generated where the identified one or more segments of the media content are played.

8. The computer-implemented method of claim 7, wherein the report is generated based on a business model including at least one of a per stream model, a per user model, and a revenue share model.

9. A system, comprising: at least one processor; and
    memory storing instructions that, when executed by the at least one processor, cause the system to:
    receive media content from a source;
    identify one or more segments of the media content via a lookup of the one or more segments of the media content in a content database;
    determine at least one asset and at least one corresponding rights holder associated with the identified one or more segments of the media content based at least in part on the lookup;
    determine one or more use territories for the at least one asset;
    determine a compliance status with respect to one or more clearance policies, the one or more clearance policies being associated with at least one of the source or a distributor, the one or more clearance policies including one or more rules associated with distribution restrictions, wherein the compliance status corresponds to a level of compliance with the one or more rules;
    determine the compliance status is below a threshold level of compliance with the one or more rules;
    provide the compliance status to the source, the compliance status including one or more compliance instructions associated with the one or more rules;
    computing an asset estimate, based at least upon the at least one corresponding rights holder and the one or more use territories, for the at least one asset associated with the identified one or more segments of the media content; and
    provide the asset estimate to the source of the media content.

10. The system of claim 9, wherein the at least one asset is a license.

11. The system of claim 9, wherein the asset estimate is a value of the asset.

12. The system of claim 9, wherein the memory storing instructions that, when executed by the at least one processor, further cause the system to:
    perform a scan of the media content over a period of time;
    detect a fingerprint of the scan;
    compare the fingerprint of the scan to data in the content database; and identify the one or more segments of the media content based at least in part on the fingerprint of the scan matching the data in the content database.

13. The system of claim 9, wherein the asset estimate is based on an average media content length.

14. The system of claim 13, wherein the asset estimate is based on a duration of the identified one or more segments of the media content divided by the average media content length.

15. The system of claim 9, wherein the memory storing instructions that, when executed by the at least one processor, further cause the system to determine a number of times that the identified one or more segments of the media content has been played based on information in a report generated where the identified one or more segments of the media content are played.

16. The system of claim 15, wherein the report is generated based on a business model including at least one of a per stream model, a per user model, and a revenue share model.

17. A computer-implemented method for processing media content, comprising:
 receiving media content;
 identifying one or more segments of the media content via a lookup of the one or more segments of the media content in a content database;
 determining one or more territories associated with the one or more segments;
 determining a compliance status with respect to one or more clearance policies, the one or more clearance policies including one or more rules associated with distribution restrictions, wherein the compliance status corresponds to a level of compliance with the one or more rules;
 determining the compliance status is below a threshold level of compliance with the one or more rules;
 providing the compliance status, the compliance status including one or more compliance instructions associated with the one or more rules;
 determining at least one business model associated with the identified one or more segments of the media content based at least in part on the identified one or more segments and the one or more territories; and
 computing royalty payment amounts based at least in part on the determined at least one business model.

18. The computer-implemented method of claim 17, wherein the at least one business model includes at least one of a per stream model, a per user model, and a revenue share model.

19. The computer-implemented method of claim 17, wherein the royalty payment amount is based on the at least one business mode, and a duration of the identified one or more segments of the media content divided by the average media content length.

20. The computer-implemented method of claim 1, wherein identifying the one or more segments of the media content comprises:
 performing a scan of the media content over a period of time;
 detecting a fingerprint of the scan;
 comparing the fingerprint of the scan to data in the content database; and
 identifying the one or more segments of the media content based at least in part on the fingerprint of the scan matching the data in the content database.

\* \* \* \* \*